Patented July 30, 1940

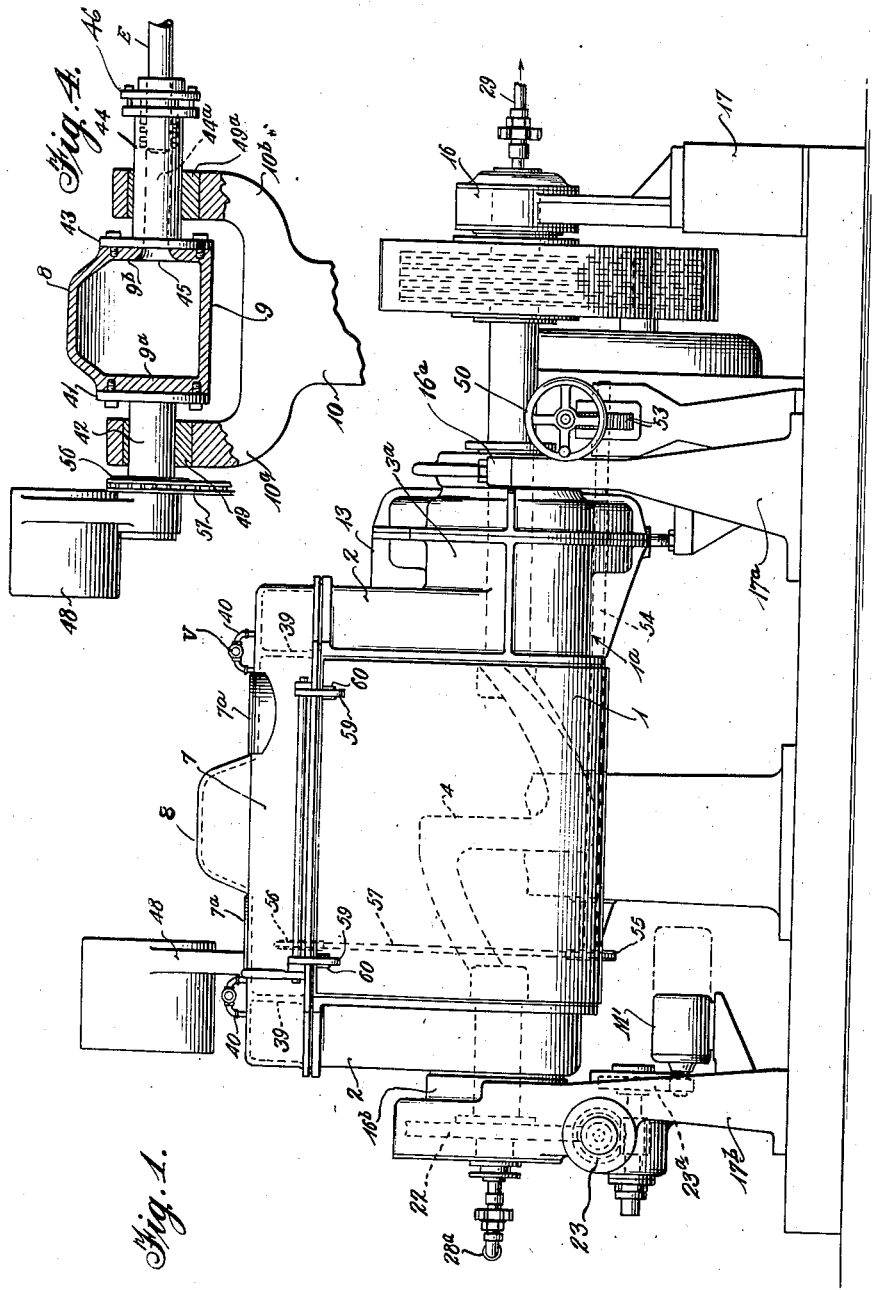

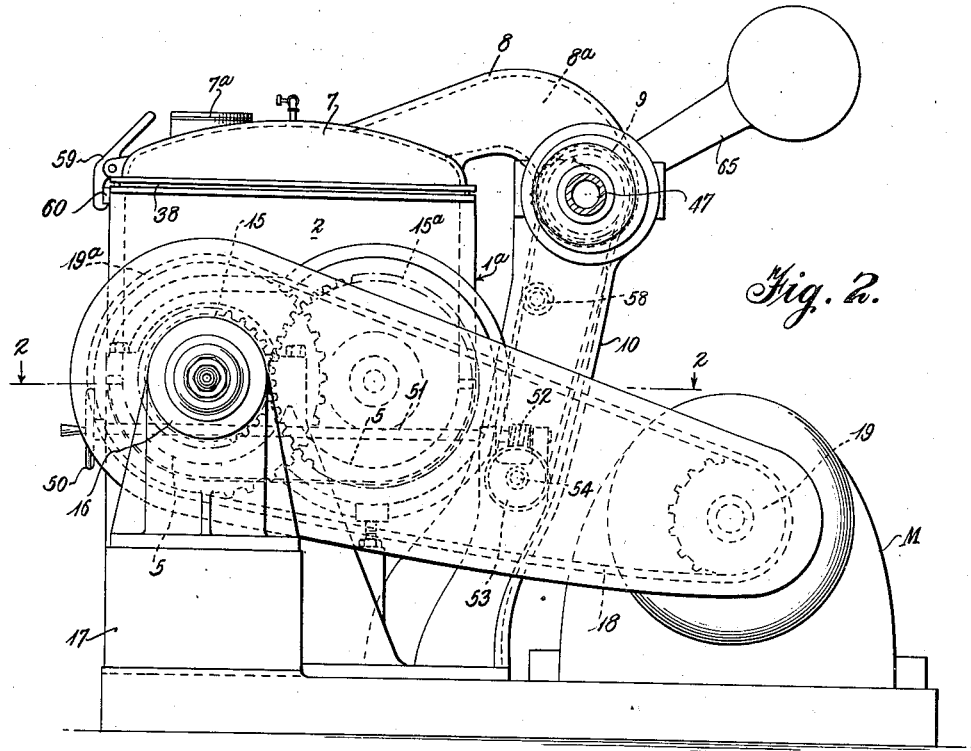

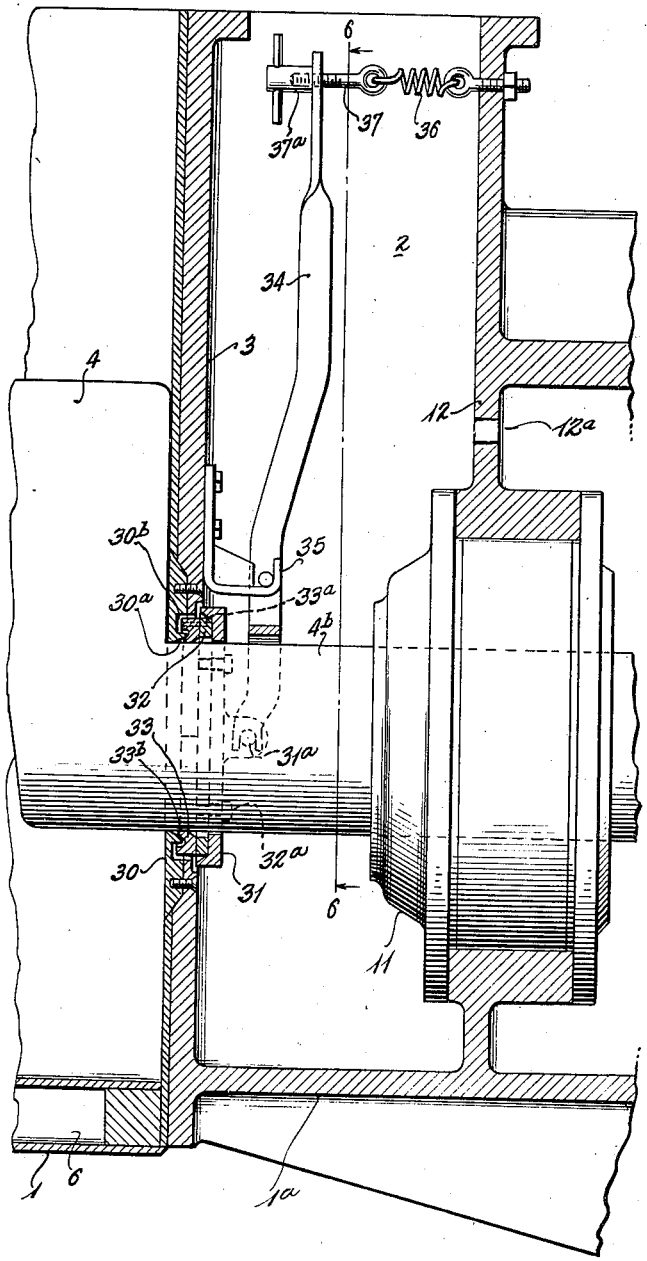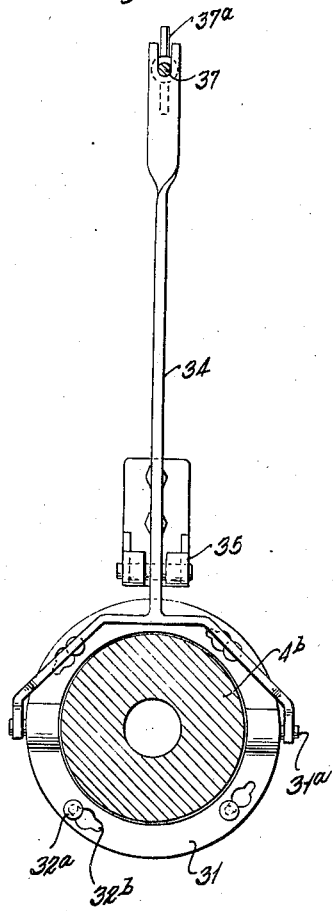

2,209,559

UNITED STATES PATENT OFFICE 2,209,559

VACUUM TYPE MIXER

Ambrose K. Brennan and James M. Jans, York, Pa., assignors to Read Machinery Company, Incorporated, York, Pa., a corporation of Pennsylvania Application April 12, 1939, Serial No. 267,504

4 Claims. (Cl. 259—104)

This invention relates to mixers and more particularly to mixers in which the mixing operation is conducted under a partial vacuum.

An important object of our invention is to provide a mixer of the vacuum type which is so constructed as to prevent lubricant or other foreign matter from entering the mixing receptacle, and thus contaminating the material being mixed, through the clearance space between the agitator shafts and the openings in the end walls of the receptacle through which they extend. More particularly this object is accomplished by the provision of vacuum compartments contiguous to the end walls of the mixing receptacle (one or both of which compartments may include a gear case for housing the driving mechanism) and by locating the shaft bearings exteriorly of and spaced from the end walls of the vacuum compartments. In the preferred form of the invention, the clearances surrounding the shafts will be closed by sealing members held in tight engagement with the end walls of the receptacle.

Another object of our invention is to provide in an apparatus of the above character a unitary hinged cover for closing the tops of the mixing receptacle and vacuum compartments so that by raising the cover access is afforded to both the receptacle and compartments.

In order to compensate for wear between the cover and the top of the mixer, the invention has for a further object to provide means whereby the center of pivotal movement of the cover may be adjusted so that the cover will seat flatly and tightly against the top of the receptacle and compartments.

The invention has as still another object to provide in a mixer of the above character ports in the cover extending between the mixing receptacle and the vacuum compartments whereby the receptacle and compartments, including the gear case, may be placed under a partial vacuum by an exhauster operatively connected through the cover with the receptacle. In the preferred form of the invention, a valve is provided for closing communication between the receptacle and compartments after an initial short period of operation of the apparatus and after a balanced sub-atmospheric condition has been attained in order to prevent vapors from the mixing receptacle from entering and condensing within the vacuum compartments.

Other objects and advantages will be apparent from the following detailed description of a preferred embodiment of the invention, reference being had to the annexed drawings in which:

Figure 1 is a view in front elevation of a mixer of the vacuum type;

Figure 2 is an end-elevational view of the mixer of Fig. 1;

Figure 3 is a detail view, in part cross-sectional, taken on the line 2—2 of Fig. 2, and showing a vacuum compartment and a shaft seal adjacent one end of the mixing receptacle;

Figure 4 is a detail view of the pivotal connection of the cover closing the top of the mixer, certain parts thereof being shown in cross-section;

Figure 5 is a vertical cross-sectional view through a vacuum compartment showing a shaft seal; and Figure 6 is a view on the line 6—6 of Fig. 5 showing the sealing ring and spring-biased lever for holding the sealing ring in place.

Referring to the drawings, the mixer illustrated therein comprises a mixing receptacle 1 provided at its opposite ends with vacuum compartments 2 located exteriorly of the end walls 3 of the receptacle. The mixer is of the double-trough type in which a pair of agitators 4 and 4a arranged in parallel rotate within a pair of arcuate bottoms 5, indicated by dotted lines in Fig. 2. The mixing receptacle is enclosed along its bottom and sides by a jacket 6 (Fig. 3) through which a heating or cooling medium is circulated in any suitable manner.

A dome-shaped cover 7, provided with glass windows 7a for viewing the interior of the mixing chamber, is integrally connected by an arched neck 8 with a hollow sleeve 9 rotatably supported in a post 10 at the rear of the mixer (see Fig. 2). The cover is of unitary construction and closes the top of the mixing receptacle as well as the tops of the two vacuum compartments at the ends of the receptacle. The neck 8 is hollow so as to afford a passageway 8a opening at one end through the cover into the mixing chamber and communicating at its other end with the hollow sleeve 9. In a manner which will later be described the hollow sleeve is connected to an exhaust fan or pump, not shown, which maintains a sub-atmospheric pressure within the mixing chamber.

In Fig. 3 is illustrated an end of the mixer. This end of the mixing receptacle 1 is closed by a hollow casting 1a forming a vacuum compartment which is open at its top on a level with the top of the mixing receptacle. One end of the casting forms the end wall 3 of the mixing receptacle while the other end of the casting constitutes the outer end wall 12 of the vacuum compartment. Adjacent its bottom the casting 1a forming the vacuum compartment is longitudinally extended to provide a gear case 3a beyond the end wall 12. An opening 12a affords communication between the portions of the vacuum compartment lying upon opposite sides of the end wall 12. The outer end of the gear case is closed by an end plate 13.

The agitators 4 and 4a are supported at their corresponding ends by shafts 4b and 4c which extend through aligned openings in the end walls 3 and 12, and in the end plate 13. Anti-friction bearings 11 and 11a respectively are securely mounted in the end wall 12 of the vacuum compartment for supporting the shafts 4b and 4c. Shaft 4b extends through a lubricated packing gland 15 in the end plate 13 and is supported at its end exteriorly of the mixer in a bearing 16 mounted on a pillar 17. Shaft 4c is supported in addition to the bearing 11a in an anti-friction bearing 11c mounted in the end plate 13 and this shaft terminates in a reduced section 4d which projects through a packing gland 14 in the end plate.

The vacuum compartment 2 at the opposite end of the mixer is similarly constructed, it being understood that agitator shafts corresponding to shafts 4b and 4c are supported in bearings arranged in the end plate plate of the vacuum compartment. These end plates 13 at opposite ends of the mixer are provided with trunnions 41 concentric with the companion shafts 4b, and these trunnions rest in bearings 16a and 16b mounted on columns 17a and 17b, respectively, to permit tipping the mixer.

Power is transmitted to the agitator 4 by means of a chain belt 18 (Fig. 2) extending between a sprocket 19 and a larger sprocket 19a keyed to one end of the shaft 4b. Sprocket 19 is driven by an electric motor M either directly or through a suitable speed reduction mechanism. Within the gear case 3a, as indicated in Fig. 3, is housed a pinion 20 keyed to shaft 4b meshing with a companion pinion 21 secured to shaft 4c. In this way both agitators are driven from the motor M.

To tip the mixer on trunnions 47 to discharge its contents a worm sector 22 attached to end plate 13 at one end of the apparatus is rotated by a worm 23 suitably driven from a motor M', through a gear train 23a. Thus when rotation is imparted to the worm 23 the mixer rocks within the bearings 16a and 16b.

For controlling the temperature of the material being mixed in addition to the control furnished by the medium in the jacket 6, the agitators and shafts are cored throughout their length as indicated at 27 in Fig. 3. During operation of the mixer a heating or cooling medium from any suitable source is circulated through the agitators from an inlet pipe 28 coupled to an end of shaft 4c. At the opposite end of the mixer the shafts are connected by a return bend pipe 28a in such manner that the heating or cooling medium after passing through the agitator 4a is returned through agitator 4 to an offtake pipe 29 coupled to shaft 4b as indicated in the drawings. If desired, the agitators may be connected in parallel for the circulation of the heating or cooling medium instead of in series as just described.

The clearances between the shafts 4b and 4c and the openings in their companion end walls 3 of the mixing receptacle through which they extend into the vacuum compartments are closed as illustrated more particularly in Fig. 5. In this figure the structure for closing the clearance about shaft 4b is shown, although it is to be understood that each of the shafts 4b and 4c, at opposite ends of the mixer, is provided with similar sealing means.

Bolted to the end wall 3 inside the mixing chamber and surrounding the shaft 4b is a closure plate 30. This closure plate is provided with a beveled inner circumference 30a disposed adjacent the shaft and expanding toward the vacuum compartment and with a circular groove 30b formed within its rear face. A sealing member is adapted to cooperate with this closure plate and to seal the clearance between the inner circumference of the closure plate and the outer circumference of the shaft. The sealing member comprises a sealing ring 31 located within the vacuum compartment and surrounding the shaft 4b. Affixed to the face of the sealing ring disposed toward the closure plate 30, is a transversely split collar 32, the two sections of which are detachably connected to the sealing ring by means of a series of headed pins 32a on the collar extending into companion keyhole slots 32b formed in the sealing ring.

To the collar 32 is fastened a transversely split packing ring 33 by screws 33a, this packing ring preferably being made of a flexible composition. The outer face of the packing ring is channeled to produce a lip 33b which bears against the beveled edge 30a of the closure plate 30 and being thereby forced into contact with the circumference of the shaft 4b.

For yieldingly urging the sealing ring and its associated parts into closing relationship with reference to the clearance surrounding the shaft 4b, a lever 34 is provided. This lever is pivoted intermediate its ends in a bracket 35 upon the end wall 3 of the mixing receptacle. The lower end of the lever is forked so as to bridge shaft 4b and each branch of the fork is slotted so as to fit over a pin 31a provided by each of a pair of ears on the sealing ring 31. The upper end of the lever is urged by a coil spring 36, connected to the end wall 12 of the vacuum compartment, in a direction such as to rock the lever about its pivotal support in bracket 35 and force the sealing ring into contact with the closure plate 30, and to consequently cause the beveled edge of the sealing plate to deflect the lip 33b of the packing ring into tight engagement with the shaft 4b. The upper end of the lever is twisted at right angles and slotted so as to straddle an eyebolt 37, which eyebolt in turn is threaded into a nut 37a engaging a face of the lever.

By virtue of the above construction the pressure exerted upon the sealing plate may be varied by simply rotating the nut 37a to move the eyebolt inwardly or outwardly of the nut thereby changing the tension of the coil spring 36. When it is desired to remove the packing ring for cleaning or renewal, it is only necessary to detach the lever 34 from the eyebolt 37 and then lift the lever from the bracket 35 and out of the vacuum compartment. The sealing ring 31 is then slid along the shaft 4b and by rotating the collar 32 and packing ring 33 relative thereto until the heads of pins 32a register with the enlarged portions of the keyhole slots 32b, the two half-sections of the combined collar and packing ring may be separated to permit their removal from around the shaft 4b. The packing ring may then be detached from the collar (by withdrawing the screws 33a) for cleaning or renewal of the packing ring.

The parts are assembled by simply reversing the order of the above steps. Each of the openings through which the shafts 4b and 4c pass into the vacuum compartments at opposite ends of the mixer are provided with sealing means as just described.

The dome-shaped cover 7 is adapted to seat flatly on a packing strip 38 surrounding the top of the mixing receptacle and vacuum compartments. The interior of the cover is provided with vertical webs 39 (Fig. 1) designed when the cover is closed to abut the tops of the end walls 3 of the mixing receptacle and thus close off communication between the mixing chamber and the vacuum compartments. Intercommunication between each vacuum compartment and the mixing chamber is afforded by a connector tube 40 of inverted U-shape mounted on the cover and bridging each web 39. Each connector tube has associated therewith a valve V so as to permit opening and closing communication between the vacuum compartment and the mixing receptacle.

For insuring that the cover will always make flat contact with the top of the mixing receptacle and vacuum compartments, the axis of pivotal movement of the cover may be adjusted upwardly or downwardly to compensate for any wear. The cover 7 as has previously been stated is supported by the arched neck 8 which is integral with a hollow sleeve 9. The means by which the hollow shaft is supported in the post 10 is indicated in Fig. 4. The post 10 provides a pair of vertical arms 10a and 10b at its upper end between which is received the hollow sleeve 9. This sleeve is of generally cylindrical shape and is formed with end walls 9a and 9b. Bolted to end wall 9a is a circular plate 41 from which a stub shaft 42 projects axially outward. Similarly a circular plate 43 having an axial stub shaft 44 is bolted to the other end wall 9b of the sleeve. The stub shafts 42 and 44 thus project axially in opposite directions from the sleeve and are received respectively in openings provided in the arms 10a and 10b of the post 10.

The circular plate 43 and stub shaft 44 are bored so as to provide a central passageway 44a extending throughout the length of this plate and stub shaft which passageway communicates through an opening 45 provided in the end wall 9b with the hollow interior of the sleeve 9. Beyond the arm 10b the stub shaft 44 communicates through a slip connection 46 with a conduit E leading to an exhaust fan or pump. The stub shaft 42 is of solid construction and is received in an opening in arm 10a, the portion of the shaft projecting beyond the arm having a counterweight 48 fastened thereto.

Surrounding and providing bearings for the stub shafts 42 and 44 are eccentric bearing rings 49 and 49a. These eccentric rings are of the same size and eccentricity so that by angularly adjusting these rings within their arms the axis of rotation of the sleeve 9, and hence of the cover 7, may be raised or lowered a limited distance.

For raising the cover a hand wheel 50 is mounted at the forward side of the mixer on one end of a horizontal shaft 51 which shaft is supported for rotation in the machine frame and carries at its other end a self-locking worm 52 (see Fig. 2). This worm meshes with a worm wheel 53 on a second horizontal shaft 54 extending longitudinally and to the rear of the mixer. Secured to shaft 54 is a sprocket 55 (see Fig. 1) and between this sprocket and a companion sprocket 56 keyed to stub shaft 42 runs a chain 57. An idler roller 58 may be suitably mounted on the post 10 to take up slack in the chain. Thus by turning the handwheel 50 the cover 7 may be readily raised or lowered. When the machine is in operation the cover is latched tightly in place by hooks 59 pivoted to the cover and adapted to swing into and out of locking engagement with lugs 60 on the mixing receptacle.

From the foregoing description it will be apparent that during operation of the mixer gases will be continuously exhausted from the mixing receptacle 1 and, through the connector tubes 40, from the vacuum compartments 2 to maintain a sub-atmospheric pressure therein. Because of the spacing of the bearings 11 and 11a for the shafts 4b and 4c away from the end walls 3 of the mixing receptacle, and because of the balanced low pressure between the mixing chamber and the vacuum compartments there is no tendency for the oil or grease required for lubrication of the bearings to be sucked into the mixing chamber. Furthermore, any oil or dirt which may find its way into the vacuum compartments is prevented from entering the mixing chamber by reason of the sealing members 31 which are wedged into the clearance spaces surrounding the shafts 4b and 4c.

Because of the possibility that vapors from the mixing chamber may migrate by way of the connector tubes 40 into the vacuum compartments and condense therein it is undesirable to maintain the connector tubes 40 open except during the initial stage of operation of the mixer. Such condensate imparts an unsightly and unsanitary appearance to the mixer and in some instances—depending upon its nature—may corrode and damage the apparatus, especially the gears 20 and 21 contained in the gear case. Therefore, after the desired low pressure has been attained in the mixing receptacle and vacuum compartments, the valves V in the connector tubes may be closed to cut off communication through tubes 40 between the mixing chamber and the compartments. The seals provided by the members 31 are effective to prevent any foreign matter from entering the mixing chamber and contaminating the product undergoing mixing and such small leakage of air as occurs past these seals permits the vacuum to be maintained in the vacuum compartments throughout the run. The manner of removing the sealing members for cleaning or replacement has already been described.

When it is desired to empty the contents of the mixer, the hand wheel 50 is rotated to raise the cover 7 and the mixer is then tilted upon its trunnions 47 in bearings 16a and 16b by connecting the worm 23 to a source of power M', as has previously been explained.

Should the cover be found not to seat tightly against the top of the mixing receptacle and the vacuum compartments because of wear upon the packing strip 38, the eccentric rings 49 and 49a may be angularly adjusted within the arms 10a and 10b of post 10 so that the axis of oscillation of the sleeve 9, and hence of the plane of the contacting surface of the cover with the mixer, is raised or lowered so that the cover bears solidly upon the packing strip.

The invention may be embodied in other specific forms without departing from the spirit or essential characteristics of the invention, and the present embodiment is therefore to be considered as illustrative and not restrictive, and all changes which come within the meaning and range of equivalency of the claims are therefore intended to be embraced therein.

We claim:

1. A vacuum type mixer comprising a fluid-tight mixing receptacle having closed side and end walls, fluid-tight vacuum compartments contiguous to the end walls of the receptacle, means for closing the tops of the receptacle and compartments, a passageway for exhausting gases from the receptacle, a passage between the receptacle and each compartment through which gases are exhausted from the compartment, means for opening and closing the passage, an agitator in the receptacle having shafts extended through the end walls of the receptacle into the compartments and bearings supporting the shafts located externally of the receptacle and spaced from its end walls.

2. A vacuum type mixer comprising a fluid-tight mixing receptacle having closed side and end walls, fluid-tight vacuum compartments contiguous to the end walls of the receptacle, a unitary cover closing the tops of the receptacle and compartments and affording access thereto, a passageway for exhausting gases from the receptacle, connector tubes on the cover bridging the end walls and providing communication between the receptacle and the compartments through which gases are exhausted from the compartments, a valve for opening and closing the connector tubes, an agitator in the receptacle having shafts extended through the end walls of the receptacle into the compartments and bearings supporting the shafts located externally of the receptacle and spaced from its end walls.

3. A vacuum type mixer comprising a fluid-tight mixing receptacle having closed side and end walls, fluid-tight vacuum compartments contiguous to the end walls of the receptacle, a unitary removable cover for closing the tops of the receptacle and compartments, a passageway for exhausting gases from the receptacle, a passage between the receptacle and each compartment through which gases are exhausted from the compartment, means for opening and closing the passage, an agitator in the receptacle having shafts extended through the end walls of the receptacle into the compartments and bearings supporting the shafts located externally of the receptacle and spaced from its end walls.

4. A vacuum type mixer comprising a fluid-tight mixing receptacle having closed side and end walls, fluid-tight vacuum compartments contiguous to the end walls of the receptacle, a unitary hinged cover for closing the tops of the receptacle and compartments, a passageway opening through the cover for exhausting gases from the receptacle, a passage between the receptacle and each compartment through which gases are exhausted from the compartment, a valve for opening and closing the passage, an agitator in the receptacle having shafts extended through the end walls of the receptacle into the compartments and bearing supporting the shafts located externally of the receptacle and spaced from its end walls.

AMBROSE K. BRENNAN.
JAMES M. JANS.